United States Patent
Ahn et al.

(10) Patent No.: US 10,104,709 B2
(45) Date of Patent: Oct. 16, 2018

(54) METHOD FOR SUPPORTING DUAL CONNECTIVITY AND DEVICE USING SAME

(71) Applicant: LG ELECTRONICS INC., Seoul (KR)

(72) Inventors: Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/310,724

(22) PCT Filed: May 28, 2015

(86) PCT No.: PCT/KR2015/005345
§ 371 (c)(1),
(2) Date: Nov. 11, 2016

(87) PCT Pub. No.: WO2015/183004
PCT Pub. Date: Dec. 3, 2015

(65) Prior Publication Data
US 2017/0086242 A1    Mar. 23, 2017

Related U.S. Application Data

(60) Provisional application No. 62/004,206, filed on May 29, 2014, provisional application No. 62/032,642, (Continued)

(51) Int. Cl.
*H04W 4/00*        (2018.01)
*H04W 76/15*       (2018.01)
(Continued)

(52) U.S. Cl.
CPC .............. *H04W 76/15* (2018.02); *H04B 7/02* (2013.01); *H04W 56/001* (2013.01);
(Continued)

(58) Field of Classification Search
CPC .. H04B 7/02; H04W 56/0005; H04W 56/001; H04W 56/0045; H04W 72/0446;
(Continued)

(56) References Cited

U.S. PATENT DOCUMENTS

2015/0078286 A1    3/2015    Kim et al.
2015/0099501 A1    4/2015    Kim et al.
(Continued)

FOREIGN PATENT DOCUMENTS

KR    1020130090804 A    8/2013
KR    1020130124755 A    11/2013
(Continued)

OTHER PUBLICATIONS

PCT International Application No. PCT/KR2015/005345, International Search Report dated Sep. 2, 2015, 23 pages.

*Primary Examiner* — Minh-Trang Nguyen
(74) *Attorney, Agent, or Firm* — Lee Hong Degerman Kang Waimey

(57) ABSTRACT

Provided is a method and device for supporting a dual connectivity in a wireless communication system. A wireless device provides, to a base station, a device capability message including information on a dual connectivity band combination supporting the dual connectivity. The wireless device supports multiple timing advances (TAs) for the dual connectivity band combination.

8 Claims, 3 Drawing Sheets

Related U.S. Application Data filed on Aug. 4, 2014, provisional application No. 62/034,171, filed on Aug. 7, 2014, provisional application No. 62/036,593, filed on Aug. 12, 2014, provisional application No. 62/058,673, filed on Oct. 2, 2014.

(51) Int. Cl.

| | |
|---|---|
| *H04W 76/10* | (2018.01) |
| *H04W 76/02* | (2009.01) |
| *H04W 56/00* | (2009.01) |
| *H04W 72/04* | (2009.01) |
| *H04W 74/08* | (2009.01) |
| *H04B 7/02* | (2018.01) |
| *H04W 8/22* | (2009.01) |

(52) U.S. Cl.
CPC ... *H04W 56/0005* (2013.01); *H04W 56/0045* (2013.01); *H04W 72/0446* (2013.01); *H04W 74/0833* (2013.01); *H04W 76/02* (2013.01); *H04W 76/025* (2013.01); *H04W 76/10* (2018.02); *H04W 8/22* (2013.01)

(58) Field of Classification Search
CPC ............. H04W 74/0833; H04W 76/02; H04W 76/025; H04W 8/22
See application file for complete search history.

(56) References Cited

U.S. PATENT DOCUMENTS

| | | |
|---|---|---|
| 2015/0103771 A1 | 4/2015 | Kim et al. |
| 2015/0245307 A1* | 8/2015 | Chen ................. H04W 56/0045 370/336 |
| 2015/0271806 A1 | 9/2015 | Kim et al. |
| 2016/0270139 A1* | 9/2016 | Rahman ................ H04W 56/00 |
| 2016/0338134 A1* | 11/2016 | Nagasaka ............. H04W 16/32 |
| 2017/0034866 A1* | 2/2017 | Wager ................. H04W 76/025 |

FOREIGN PATENT DOCUMENTS

| | | |
|---|---|---|
| KR | 1020130125721 A | 11/2013 |
| KR | 1020130127367 A | 11/2013 |
| KR | 1020140047504 A | 4/2014 |
| WO | 2013119018 A1 | 8/2013 |

* cited by examiner

METHOD FOR SUPPORTING DUAL CONNECTIVITY AND DEVICE USING SAME

CROSS-REFERENCE TO RELATED APPLICATIONS

This application is the National Stage filing under 35 U.S.C. 371 of International Application No. PCT/KR2015/005345, filed on May 28, 2015, which claims the benefit of U.S. Provisional Applications No. 62/004,206, filed on May 29, 2014, 62/032,642, filed on Aug. 4, 2014, 62/034,171, filed on Aug. 7, 2014, 62/036,593, filed on Aug. 12, 2014 and 62/058,673 filed on Oct. 2, 2014, the contents of which are all hereby incorporated by reference herein in their entirety.

BACKGROUND OF THE INVENTION

Field of the Invention

The present invention relates to wireless communication, and more particularly, to a method for supporting a dual connectivity in a wireless communication system, and a device using the method.

Related Art

With the advancement of mobile technologies, a usage amount of data traffic is rapidly increased. In order for the data traffic to be processed much faster and with more amount by using a limited radio resource, a standardization task and a technology development are underway in several aspects. A representative example thereof may include three dimensional (3D) beam forming, massive multiple input multiple output (MIMO), a heterogeneous network, a small cell, or the like.

The small cell is used in one of techniques for increasing a traffic capacity and a data rate. In general, the small cell is disposed as a hotspot within coverage of a macro cell. A backhaul between the small cell and the macro cell may be ideal or non-ideal. A technique such as an intra-site carrier aggregation (CA) or a coordinated multi-point (CoMP) assumes an ideal backhaul. A dual connectivity is also called an inter-side CA, and assumes a non-ideal backhaul. The ideal backhaul does not almost consider a transmission delay between network nodes, whereas the transmission delay between the network nodes must be considered in a dual connectivity having a non-ideal backhaul.

SUMMARY OF THE INVENTION

The present invention provides a method for supporting a dual connectivity and a device using the method.

In an aspect, a method for supporting a dual connectivity in a wireless communication system is provided. The method includes providing, by a wireless device, a base station with a device capability message including device capability information regarding a dual connectivity band combination for which the dual connectivity is supported, and performing, by the wireless device, the dual connectivity through at least two cell groups in a band within the dual connectivity band combination. The capability information further includes information indicating that multiple timing advances (TAs) are supported for the dual connectivity band combination.

The at least two cell groups may include a master cell group (MCG) and a secondary cell group (SCG).

Different TAs may be applied to a cell belonging to the MCG and a cell belonging to the SCG.

In another aspect, a device for supporting a dual connectivity in a wireless communication system includes a transceiver configured to transmit and receive a radio signal, and a processor operatively coupled to the transceiver. The processor is configured to provide a base station with a device capability message including device capability information regarding a dual connectivity band combination for which the dual connectivity is supported, and perform the dual connectivity through at least two cell groups in a band within the dual connectivity band combination. The capability information further includes information indicating that multiple timing advances (TAs) are supported for the dual connectivity band combination.

A delay in a dual connectivity can be avoided when a mismatch occurs between a base station and a device.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP Technical Specification (TS). This is for exemplary purposes only, and the present invention is also applicable to various wireless communication systems.

A wireless device may be served by a plurality of serving cells in a carrier aggregation (CA) environment or a dual connectivity environment. Each serving cell may be defined by a downlink (DL) component carrier (CC) or a pair of a DL CC and an uplink (UL) CC.

A serving cell may be classified into a primary cell and a secondary cell. The primary cell operates at a primary frequency, and performs an initial connection establishment procedure or initiates a connection reestablishment procedure, or is a cell designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by upper layer signaling (e.g. RRC message). A cell index (CI) of the primary cell may be fixed. For example, a lowest CI may be set as the CI of the primary cell. Hereinafter, the CI of the primary cell is set to zero, and the CI of a secondary cell may be assigned subsequently starting from one.

Figure 1:
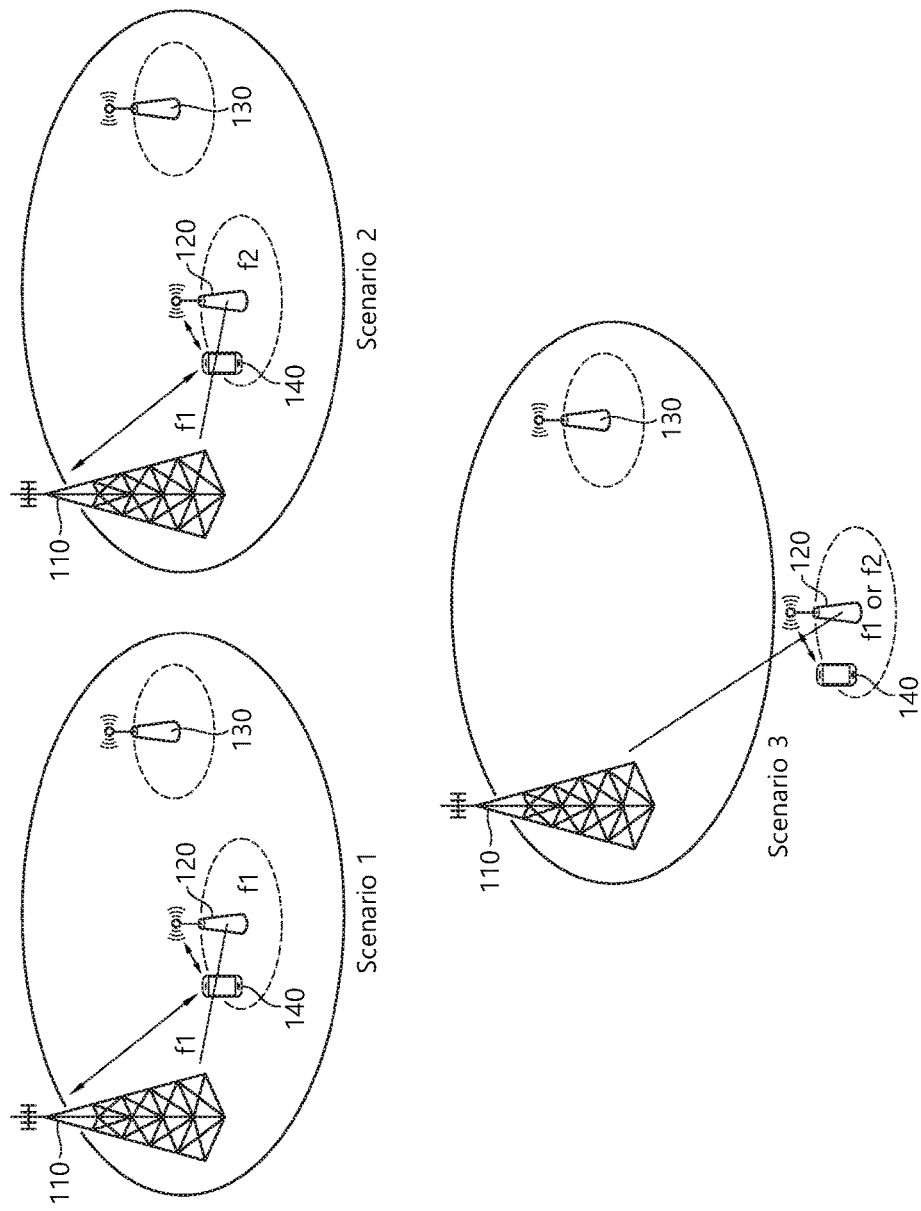
FIG. 1 shows various examples of a scenario to which a dual connectivity is applied.

FIG. 1 shows various examples of a scenario to which a dual connectivity is applied.

It is assumed that a 1st BS 110 is a macro BS having wide coverage, and 2nd and 3rd BSs 120 and 130 are small BSs having relatively small coverage. A cell operated by the macro BS 110 is called a macro cell, and a cell operated by the small cells 120 and 130 is called a small cell. Each BSs 110, 120, and 130 may operate one or more cells.

A scenario 1 is a case where the macro BS 110 and the small BSs 120 and 130 communicate with a wireless device 140 by using the same frequency band. A scenario 2 is a case where the macro BS 110 and the small BSs 120 and 130 communicate with the wireless device 140 by using different frequency bands. A scenario 3 is a case where the small BS 120 is out of coverage of the macro BS 110 and communicates with the wireless device 140 by using the same or different frequency bands.

In a dual connectivity, a master cell group (MCG) and a secondary cell group (SCG) may be configured to the wireless device. The MCG is a group of serving cells having a primary cell (PCell) and zero or more secondary cells (SCells). The MCG may be served by the macro BS 110, and the SCG may be served by one or more small BSs 120 and 130. The SCG is a group of secondary cells having a primary secondary cell (PSCell) and zero or more secondary cells. The MCG cell is a cell belonging to the MCG, and the SCG cell is a cell belonging to the SCG. The PSCell is a secondary cell on which the wireless device performs a random access, and is a cell to which an uplink control channel (e.g., a physical uplink control channel (PUCCH)) can be transmitted.

Figure 2:
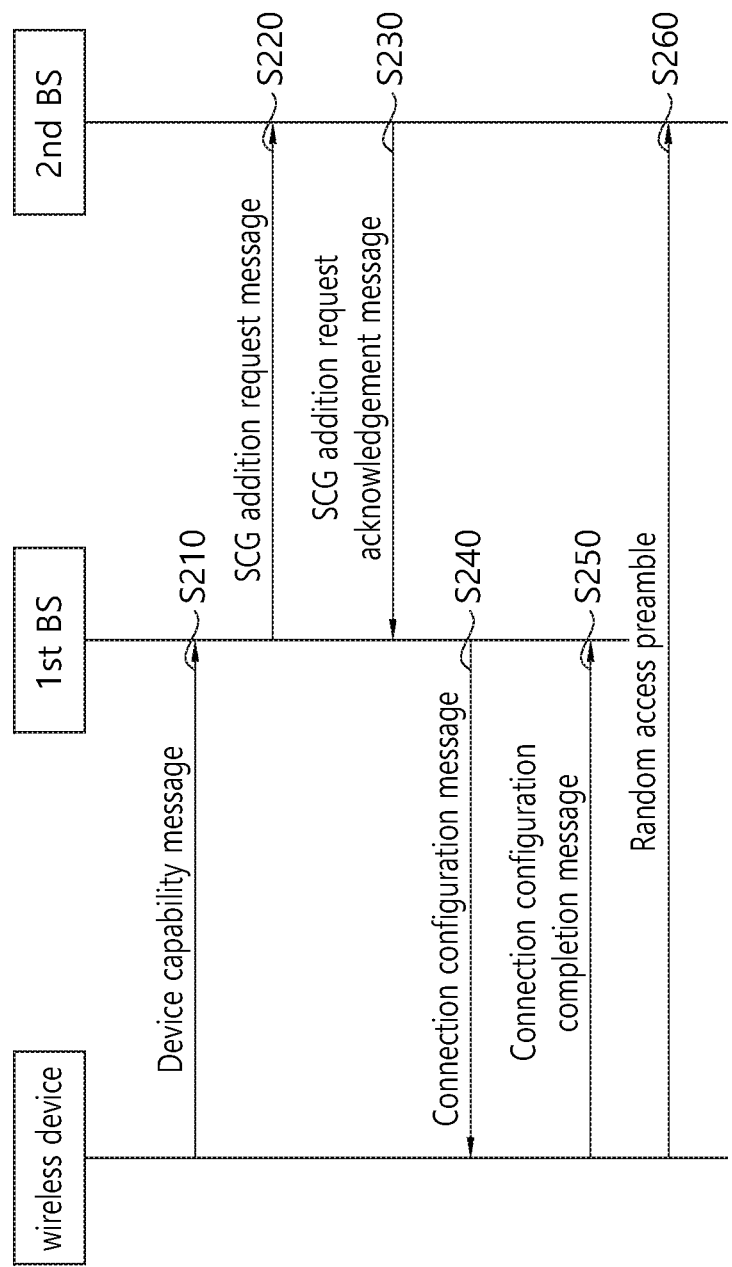
FIG. 2 shows a method for supporting a dual connectivity according to an embodiment of the present invention.

FIG. 2 shows a method for supporting a dual connectivity according to an embodiment of the present invention. A 1st BS may be a macro BS, and a 2nd BS may be a small BS.

In step S210, a wireless device having access to the 1st BS sends a device capability message. The device capability message may be transmitted in response to a request from the 1st BS. The device capability message may include information regarding a device capability described below. Hereinafter, it is assumed that the wireless device supports the dual connectivity.

In step S220, the 1st BS sends to the 2nd BS a secondary cell group (SCG) addition request message. The SCG addition request message may include a measurement result regarding an SCG cell requested to be added, device capability information, a radio resource request for a dual connectivity, or the like.

In step S230, the 2nd BS sends to the 1st BS an SCG addition request acknowledge message for accepting the request.

In step S240, the 1st BS sends to the wireless device a connection configuration message having a radio resource configuration of an SCG. The connection configuration message may include SCG related information (e.g., a cell and/or band for configuring the SCG, which cell is a PSCell, or the like). Further, the SCG related information may further include information (e.g., a preamble index) for performing synchronization with the PSCell. The connection configuration message may include a radio resource control (RRC) connection configuration message or an RRC connection reconfiguration message.

In step S250, the wireless device applies an SCG configuration, and sends a connection configuration completion message to the 1st BS.

In step S260, the wireless device performs synchronization by transmitting a random access preamble to the PSCell of the SCG.

Now, a timing advance group (TAG) is described.

To decrease an interference caused by uplink (UL) transmission between wireless devices, it is important for a base station (BS) to maintain a UL time alignment of the wireless devices. The wireless device may be located in any area in a cell. A UL signal transmitted by the wireless device may arrive to the BS at a different time according to the location of the wireless device. A signal arrival time of a wireless device located in a cell edge is longer than a signal arrival time of a wireless device located in a cell center. On the contrary, the signal arrival time of the wireless device located in the cell center is shorter than the signal arrival time of the wireless device located in the cell edge. In order to perform scheduling such that the UL signals can be received within a time boundary, a UL transmission timing is controlled by adjusting a timing alignment (TA) value. The TA value may be information which is sent by the BS to the wireless device to maintain the UL time alignment, and this information is indicated by a timing alignment command.

In a typical carrier aggregation (CA) environment, even if the wireless device supports a plurality of serving cells, one TA value may be commonly applied to the plurality of serving cells. However, if the plurality of serving cells use different frequencies or if a dual connectivity (DC) is configured, a propagation characteristic varies. As a result, it may be difficult to apply the same TA value.

A TA group (TAG) is defined to apply an independent TA. The TAG includes one or more cells to which the same TA is applied. One TAG can include an MCG cell or an SCG cell, but cannot include both of the MCG cell and the SCG cell. The TA is applied for each TA group, and a time alignment timer runs for each TA group. The wireless device can perform UL transmission for a cell in a corresponding TAG only when the time alignment timer is running. Information regarding a configuration of the TA group may be reported by a PSCell to the wireless device.

Now, a method for supporting a dual connectivity is described.

In the conventional 3GPP LTE, various capabilities of a wireless device are provided to a BS in order to support various functions. Examples of parameters for a device capability are described below.

Hereinafter, abbreviations are used for convenience, and an [xx] field may be provided to the BS by being included in a device capability message. When it is reported that a corresponding function is supported, it is expressed by '[xx] is supported'.

[sp1] simultaneousPUCCH-PUSCH: This field defines whether the wireless device supports simultaneous transmission of a physical uplink shared channel (PUSCH) and a PUCCH.

[mc] multiClusterPUSCH-WithinCC: This field defines whether the wireless device supports multi-cluster PUSCH transmission in a component carrier (CC).

[nc] nonContiguousUL-RA-WithinCC-Info: This field indicates whether the wireless device supports a non-contiguous UL resource allocation in a CC.

[mt] multipleTimingAdvance: This field indicates whether the wireless device supports a plurality of TAG configurations. This field may indicate whether multiple TAs are supported for each band combination. This field may indicate whether different TAs are supported for different band combinations.

[rt] simultaneousRx-Tx: This field indicates whether the wireless device supports simultaneous transmission and reception in different bands.

[hd] half duplex operation only: This field indicates whether only a half-duplex operation is supported for a corresponding frequency division duplex (FDD) band.

In order to support a dual connectivity, an additional parameter may be defined for a dual connectivity capability as follows.

[dc] DualConnectivity: This field indicates whether the wireless device supports a dual connectivity. It may be defined for a specific band or for each band combination.

[sp2] SCellPUCCH: This field indicates whether a PUCCH can be simultaneously transmitted in different cells, or whether the PUCCH can be transmitted in a cell other than the PCell.

[at] asynchronous transmission/reception: This field indicates whether the wireless device supports a UL transmission difference greater than or equal to a specific value. Further, this field may indicate whether the wireless device also supports a DL reception difference greater than or equal to a specific value.

Since the dual connectivity is for supporting a serving cell operated independently by different BSs, a device capability may be limited as follows to effectively operate the dual connectivity.

For a band or band combination supporting [dc], the wireless device supports [sp1] and/or [sp2].

For the band or band combination supporting [dc], the wireless device supports [mt] or [at].

For a band combination including a TDD band supporting [dc], the wireless device supports [rt]. The wireless device supporting [dc] and [rt] may support different TDD configurations between a PCell and a PSCell.

The wireless device supports [rt] between a band belonging to an MCG and a band belonging to an SCG.

For the band or band combination for support [dc], the wireless device supports a full duplex. The wireless device may support the full duplex between an FDD band belonging to an MCG and a TDD band belonging to an SCG bane. It may be configured such that only bands supporting [rt] belong to different BSs. Alternatively, it may be configured such that a band belonging to [hd] is not included or different carriers in the band belonging to [hd] do not belong to different BSs.

Meanwhile, the wireless device may provide the BS with information regarding two bands or band sets that can be configured to the MCG and the SCG. When a band for which a dual connectivity is supported is called a DC band, one pair of band sets that can be configured to the MCG and the SCG is called a DL band pair. The wireless device may provide the BS with information regarding a band or band combination for which the wireless device can support the dual connectivity. The wireless device may provide the BS with information regarding at least one DC band for the MCG and at least one DC band for the SCG. The wireless device may provide the BS with information regarding at least DC band for the PCell and at least one DC band for the PSCell.

Although two bands which may belong to the MCG and the SCG are defined as a DC band pair, it may not be expected that a dual connectivity is supported for carriers of bands not designed as the DC band pair. For example, it is assumed that the wireless device supports a band combination (X, Y, Z) as a DC band combination, and band pairs (X, Y) and (X, Z) are DC band pairs. This wireless device may not support (X,Y;Z), (Y;Z), (X,Z;Y) as DC band pairs.

Among band pairs not corresponding to the DC band pair, if a band pair belongs to a DC band combination and a frequency separation thereof is greater than that of the DC band pair, it may be assumed that the band pair corresponds to the DC band pair.

Now, a method of configuring a band combination for a CA and a dual connectivity is described.

For a CC combination included in a band combination reported as being supportable by the wireless device, the wireless device must be able to perform a CA operation. For example, it is assumed that the wireless device reports its capability such that the CA operation is possible in a band combination {A, B, C}. The CA operation must be possible for a combination of CCs belonging to the band {A, B, C}. For a dual connectivity, since a plurality of CCs can be divided into at least two groups (i.e., an MCG and an SCG), how to be divided into a cell group in a band combination for which a CA is supported needs to be equally understood between the wireless device and the BS. Hereinafter, only two cell groups are assumed.

(Method 1) A dual connectivity may be supported for any two sub-sets among a plurality of bands belonging to a band combination for which it is reported that the wireless device supports a CA and a DC. For example, if the band combinations {A, B, C} supports the CA, then [{A}, {B, C}], [{A, B}, {C}], [{A, C}, {B}] support the dual connectivity. Herein, { } denotes that the CA is supported, and [ ] denotes that the dual connectivity is supported.

(Method 2) A dual connectivity may be supported such that only bands belonging to different bands in an inter-band CA belong to each cell group among a plurality of bands belonging to a band combination for which it is reported that the wireless device supports a CA or a DC. For example, it is assumed that a CA is supported for {A, B, C}, and bands A and B belong to the same band. [{A, B}, {C}] is supported, whereas [{A}, {B, C}], [{A, C}, {B}] are not supported.

(Method 3) The wireless device may provide the BS with a 1st band combination supporting a CA or a DC or a 2nd band combination supporting a dual connectivity in the 1st band combination. For example, the wireless device may report a 1st band combination {A, B, C} supporting the CA, and may report a 2nd band combination [{A}, {B, C}], [{A, C}, {B}] supporting the DC. In this case, among cell groups, which one corresponds to an MCG may be designated.

The above methods 1 to 3 may also be applied to a band combination for which it is reported that the wireless device supports a DC.

Meanwhile, in order to prevent PUCCH traffic from being concentrated on a specific cell in a network, even if a dual connectivity is not supported, a user equipment (UE) supporting SCell offloading of a PUCCH may be implemented in a CA situation. It may be configured such that a plurality of serving cells configured to the wireless device are divided into a plurality of sub-groups, and one cell transmits a PUCCH for each sub-group.

Whether to support PUCCH offloading may be regarded as being possible for a band combination for which a dual connectivity is supported, without an additional signaling.

The PUCCH offloading does not necessarily require the support of the TAG, and is easily implemented also in an intra-band contiguous CA situation. Therefore, the wireless device supporting [sp1] and/or [sp2] may support the PUCCH offloading for all band combinations.

The wireless device may provide a network with whether the PUCCH offloading is supported, as capability information. The PUCCH offloading may be supported for a band combination supporting at least any one of [dc], [sp1], [sp2], [mt], [at], and [rt].

Alternatively, similarly to the methods 1 to 3 for supporting a DC band pair for the band combination supporting the CA and the DC, a band combination for which a PUCCH sub-group pair can be supported may be derived for a band combination supporting PUCCH offloading.

Figure 3:
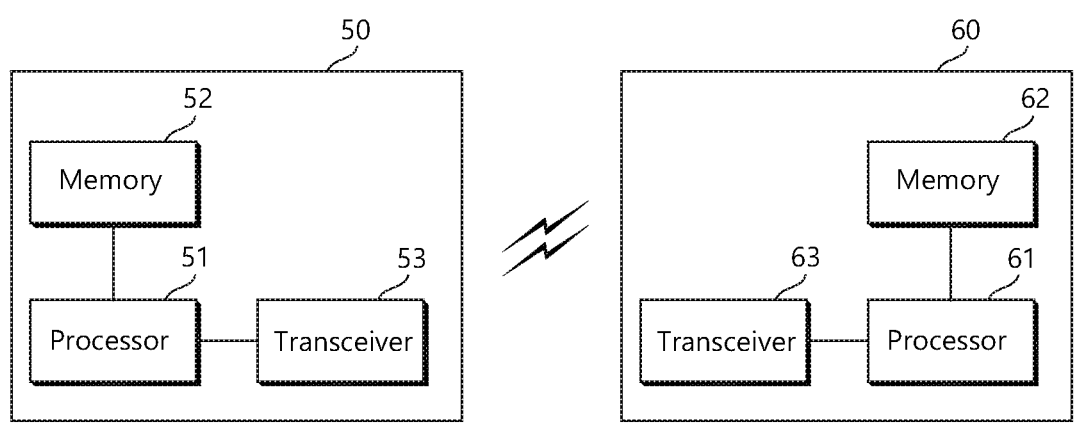
FIG. 3 is a block diagram showing a wireless communication system for which an embodiment of the present invention is implemented.

FIG. 3 is a block diagram showing a wireless communication system for which an embodiment of the present invention is implemented.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may corresponds to a primary cell or a secondary cell. Alternatively, the BS 60 may correspond to a cell for transmitting a CRS/DRS. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of each cell may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for supporting a dual connectivity in a wireless communication system, the method comprising:
providing, by a wireless device, a base station with a device capability message including device capability information regarding a combination of dual connectivity bands for which the dual connectivity is supported; and
performing, by the wireless device, the dual connectivity through at least two cell groups, including a master cell group (MCG) and a secondary cell group (SCG), in a band within the combination of the dual connectivity bands,
wherein the capability information further includes first information, second information, third information, and fourth information,
wherein the first information indicates that simultaneous transmission of a physical uplink shared channel (PUSCH) and a physical uplink control channel (PUCCH) is supported for the dual connectivity bands or the combination of the dual connectivity bands,
wherein the second information indicates that multiple timing advances (TAs) are supported for the dual connectivity bands or the combination of the dual connectivity bands,
wherein the third information indicates that simultaneous transmission and reception in different bands is supported for the combination of the dual connectivity bands including a time division duplex (TDD) band, and
wherein the fourth information indicates that the simultaneous transmission and reception is supported between a band belonging to the MCG and a band belonging to the SCG.

2. The method of claim 1, wherein the MCG is operated by the base station.

3. The method of claim 1, wherein the SCG is operated by another base station different from the base station.

4. The method of claim 1, wherein different TAs are applied to a cell belonging to the MCG and a cell belonging to the SCG.

5. The method of claim 1, further comprising:
receiving, from the base station, a connection request message for requesting a connection to one of cells belonging to the SCG.

6. The method of claim 5, further comprising:
transmitting, to the cell for which the connection is requested, a random access preamble for performing synchronization.

7. The method of claim 6, wherein the connection request message includes information regarding the random access preamble.

8. A device for supporting a dual connectivity in a wireless communication system, the device comprising:
a transceiver configured to transmit and receive a radio signal; and
a processor operatively coupled to the transceiver and configured to:
provide a base station with a device capability message including device capability information regarding a combination of dual connectivity bands for which the dual connectivity is supported; and
perform the dual connectivity through at least two cell groups, including a master cell group (MCG) and a secondary cell group (SCG), in a band within the combination of the dual connectivity bands,
wherein the capability information further includes first information, second information, third information, and fourth information,
wherein the first information indicates that simultaneous transmission of a physical uplink shared channel (PUSCH) and a physical uplink control channel (PUCCH) is supported for the dual connectivity bands or the combination of the dual connectivity bands, wherein the second information indicates that multiple timing advances (TAs) are supported for the dual connectivity bands or the combination of the dual connectivity bands, wherein the third information indicates that simultaneous transmission and reception in different bands is supported for the combination of the dual connectivity bands including a time division duplex (TDD) band, and wherein the fourth information indicates that the simultaneous transmission and reception is supported between a band belonging to the MCG and a band belonging to the SCG.

\* \* \* \* \*